United States Patent [19]

Nomura et al.

[11] Patent Number: 5,232,971
[45] Date of Patent: Aug. 3, 1993

[54] POLYOLEFIN RESIN COMPOSITION

[75] Inventors: Manabu Nomura; Kouji Sato; Kaoru Wada, all of Ichihara, Japan

[73] Assignee: Idemitsu Petrochemical Co., Ltd., Tokyo, Japan

[21] Appl. No.: 850,819

[22] Filed: Mar. 13, 1992

[30] Foreign Application Priority Data

Mar. 13, 1991 [JP] Japan .................. 3-72135

[51] Int. Cl.$^5$ .................. C08K 3/34; C08L 53/00
[52] U.S. Cl. .................. 524/424; 524/445; 524/449; 524/451; 524/497
[58] Field of Search .............. 524/424, 445, 449, 451, 524/497

[56] References Cited

U.S. PATENT DOCUMENTS

| | | | |
|---|---|---|---|
| 4,268,552 | 5/1981 | Durdevani et al. | 524/451 |
| 4,480,065 | 10/1984 | Kawai et al. | 524/424 |
| 4,504,617 | 3/1985 | Yui et al. | 524/451 |
| 4,550,134 | 10/1985 | Isogai et al. | 524/451 |
| 4,621,114 | 11/1986 | Watanabe | 524/451 |
| 4,626,565 | 12/1986 | Kawai et al. | 524/451 |
| 4,851,470 | 7/1989 | George | 524/451 |
| 4,866,117 | 9/1989 | Egashira et al. | 524/424 |
| 4,945,005 | 7/1990 | Aleckner, Jr. et al. | 524/451 |
| 5,023,286 | 6/1991 | Abe et al. | 524/451 |
| 5,082,888 | 1/1992 | Abe et al. | 524/451 |
| 5,082,889 | 1/1992 | Koizumi et al. | 524/451 |

*Primary Examiner*—Kriellion S. Morgan
*Attorney, Agent, or Firm*—Oblon, Spivak, McClelland, Maier & Neustadt

[57] ABSTRACT

A polyolefin resin composition including
(1) 67 to 96 wt.%, based on the total quantity of (1), (2) and (3), of polyolefin,
(2) 3 to 25 wt.%, based on the total quantity of (1), (2) and (3), of titanium oxide,
(3) 3 to 30 wt.%, based on the total quantity of (1), (2) and (3), of a plate-shaped inorganic filler, and
(4) 5 to 150 ppm, based on the total quantity of (1), (2) and (3), of carbon black. The polyolefin resin composition of the present invention is superior in brightness and light intercepting properties and may be advantageously employed in e.g. a material of a meter casing for an automobile.

4 Claims, 2 Drawing Sheets

POLYOLEFIN RESIN COMPOSITION

BACKGROUND OF THE INVENTION

1. Field of the Invention

This invention relates to a polyolefin resin composition containing titanium oxide and an inorganic filler and which may be used advantageously as, for example, a material for a meter casing for a motor car.

2. Related Art

Recently, a demand centered around that as a material for a meter casing of an automotive vehicle has been raised for polyolefin which is excellent in brightness and light intercepting properties.

The conventional practice for meeting such demand has been to incorporate a large quantity of titanium oxide in polyolefin. However, the resin composition, containing a larger quantity of titanium oxide, is increased in specific gravity and poor in moldability, while being low in economic profitability.

Some proposals have been made for overcoming the above drawbacks. For example, the JP Patent Publication KOKAI Nos. 60-60146 (1985) and 56-109235 (1981) disclose adding a specified inorganic filler to polyolefin besides titanium oxide.

However, the technologies disclosed in these Publications are not fully effective in overcoming the above drawbacks, such that it is impossible to diminish the amount of addition of Titanium oxide significantly.

SUMMARY OF THE INVENTION

In view of the above described status of the art, it is an object of the present invention to provide a polyolefin resin composition in which the amount of addition of titanium oxide is diminished and which exhibits significantly improved light intercepting properties without lowering its brightness.

The present inventors have conducted eager searches towards accomplishing the above object, and found that, by adding a minor quantity of carbon black to a white-hued high-brightness composition composed of polyolefin added to by titanium oxide and the specific inorganic filler, the composition may exhibit improved light intercepting properties while maintaining its brightness.

Thus the present invention provides a polyolefin resin composition comprising (1) 67 to 96 wt.%, based on the total quantity of (1), (2) and (3), of polyolefin, (2) 3 to 25 wt.%, based on the total quantity of (1), (2) and (3), of titanium oxide, (3) 3 to 30 wt.%, based on the total quantity of (1), (2) and (3), of a plate-shaped inorganic filler, and (4) 5 to 150 ppm, based on the total quantity of (1), (2) and (3), of carbon black.

By addition of a minor quantity of carbon black, the polyolefin resin composition of the present invention is significantly improved in light intercepting properties, despite the minor titanium oxide content, while brightness is maintained at a higher level. The resin composition of the present invention is superior in specific weight and moldability and may be advantageously employed in e.g. a meter case material for an automobile.

DETAILED DESCRIPTION OF THE INVENTION

Figure 1:
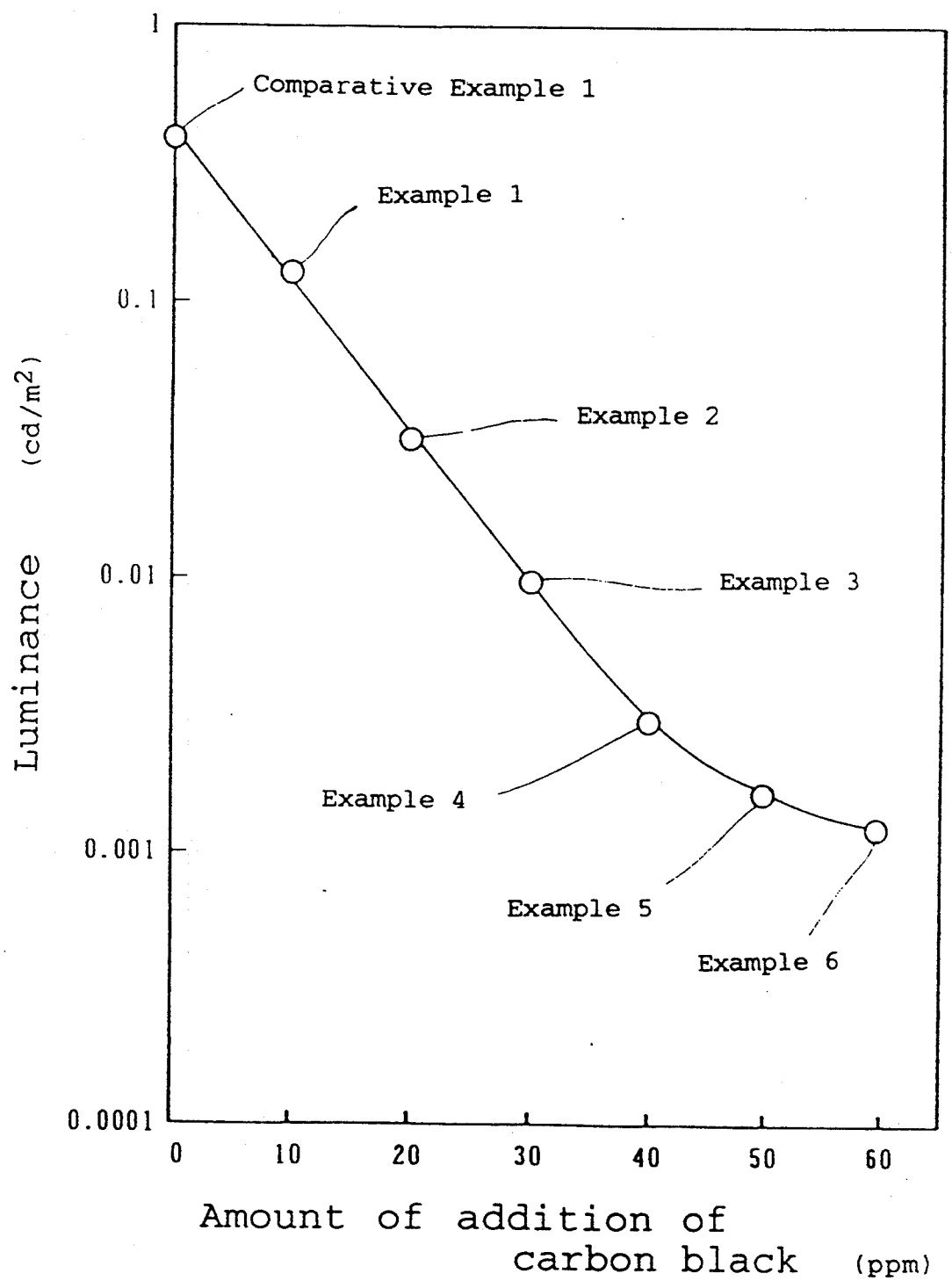
FIG. 1 is a graph showing the relation between the amount of addition of carbon black and light intercepting properties of the polyolefin resin composition of the present invention.

The present invention will be explained in detail hereinbelow.

In the first place, various components of the present composition will be explained.

(1) Polyolefin

Although there is no specific limitation to polyolefins, a homopolymer of an α-olefin, such as ethylene, propylene or butylene, a copolymer or a block copolymer of an α-olefin with other α-olefins, may be employed. Of these, a propylene homopolymer or a crystalline ethylen-propylene copolymer, above all, a propylene homopolymer, is preferred. Especially, a propylene homopolymer or a crystalline ethylen-propylene copolymer having a melt index (MI) of 10 g/10 minutes, above all, 15 to 60 g/10 minutes, is preferred.

The amount of addition of polyolefin is 67 to 96 wt. %, preferably 75 to 90 wt. %, of the total amount of components (1), (2) and (3). If the amount is less than 67 wt. %, impact strength and moldability become poor, whereas, if the amount exceeds 96 wt. %, the light intercepting properties are lowered.

(2) Titanium Oxide

Any titanium oxide prepared by known method such as the sulfuric acid method or chlorine method may be employed. Titanium oxide may be of the rutile or anatase structure. Titanium oxide of the rutile structure, produced by the chlorine method, is most preferred.

The amount of addition of titanium oxide is 3 to 25 wt. % and preferably 4 to 20 wt. % of the total amount of components (1) to (3). If the amount of addition is less than 3 wt. %, light barrier properties of the composition is lowered, whereas, if it exceeds 25 wt. %, the specific gravity is increased, while impact strength is lowered and economic profitability is eventually lost.

(3) Plate-Shaped Inorganic Filler

The plate-shaped inorganic filler, employed in the present invention, means a plate-shaped article having preferably an aspect ratio (average diameter/average thickness of a flake) is excess of 3.

Although not limitative, one or more of talc, mica, sericite and clay is preferably employed as the plate-shaped inorganic filler. Above all, talc and mica are preferred.

The amount of the plate-shaped inorganic filler is 3 to 30 wt. %.and preferably 5 to 25 wt. % of the sum total of the components (1) to (3). If the amount is less than 3 wt. %, only little effects in improving light intercepting properties and toughness are accrued. If the amount exceeds 30 wt. %, the composition is increased in specific gravity and becomes poor in moldability and impact strength.

(4) Carbon Black

There is no limitation to the type of carbon black, and any of channel black, furnace black, thermal black and acetylene black, may be employed.

The particle size of the carbon black is preperably 10 to 85 pm and more preferably 15 to 25 µm.

The amount of carbon black is 5 to 150 ppm and preferably 10 to 100 ppm (by weight) of the sum total of the components (1) to (3). With the amount of the carbon black less than 5 ppm, only little effects in improving light intercepting properties are accrued, whereas, with the amount of carbon black exceeding 150 ppm, the composition is lowered in brightness and, in the event of a lesser amount of titanium oxide, the composition tends to assume a gray color hue instead of a white color hue.

There is no limitation to the method for the preparation of the composition. Thus an ordinary kneader, such as a biaxial kneader, may be used for the preparation. The composition may be admixed with various additives, such as anti-oxidants, weather-proofing agents, mold release agents or antistatics, as the occasion may demand.

EXAMPLES

The present invention will be explained further with reference to non limitative Examples.

Comparative Example 1

75 wt. % of a propylene homopolymer, with an MI of 20 g/10 minutes, 7 wt. % of titanium oxide and 18 wt. % of talc, were dry-blended and kneaded by a biaxial kneader (2 FCM, manufactured by KOBE SEIKO KK) at a temperature of 200° C. to produce a target pellet.

The produced pellet was dried at 80° C. for 3 hours and a test sample was prepared by injection molding. Light intercepting properties and density of the test sample were measured.

Density was measured by substitution in water under conditions prescribed in JIS K 7112.

Figure 2:
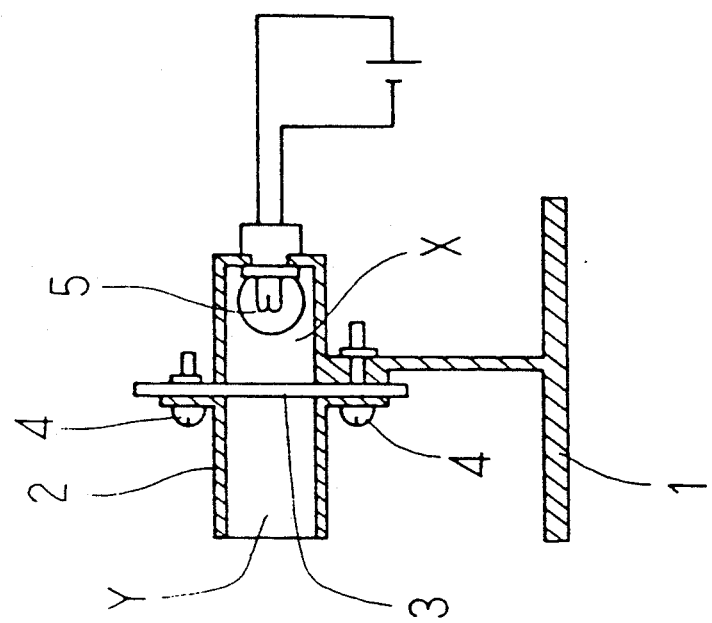
FIG. 2 is a schematic side view, shown partially in cross-section, and showing a device for measuring light intercepting properties.
Figure 2:
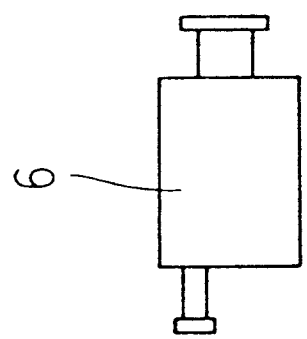

Light intercepting properties were checked using an apparatus shown in FIG. 2, in which 1 is a sample holder having an upper tubular sample attachment section 2. 3 is a plate-shaped sample secured to the attachment section 2 by bolts 4, 4. 5 is a light source secured to the proximal end of the attachment section 2, and 6 is a luminance meter mounted for facing an end opening of the attachment section. The inner surface of the attachment section 2 is coated with a white lustrous coating agent in a region extending from the sample mounting point towards the proximal end (indicated X in FIG. 2) and with a black matted coating in a region extending from the sample mounting point towards the distal end (indicated Y in FIG. 2). With the present apparatus, light intercepting properties of the sample 3 were checked by irradiating the sample 3 with light from the light source 5 and measuring the luminance of the light transmitted through the sample by luminance meter 6. The lower the luminance, the better are light intercepting properties of the sample 3.

Meanwhile, a TOPCON color luminance meter BM-5 manufactured by TOKYO KOGAKU KIKAI KK was used as luminance meter 6 and an electric bulb (12 V, 3.4 W) was used as light source 5. The voltage of the measuring light source was set to 12 V. The sample 3 was 50 mm×50 mm in size and 1 mm in thickness. The distance from light source 5 to sample 3 was about 14 mm and that from sample 3 to luminance meter 6 was about 200 mm. The inside diameter of the sample attachment section 2 was about 20 mm, and the distance from sample 3 to an opening of the sample attachment section 2 was about 18 mm.

The results are shown in FIG. 1.

EXAMPLE 1

A test sample was prepared and measured in the same manner as in Comparative Example 1 except adding 10 ppm of carbon black (furnace black with particle size of 18 to 24 µm) besides propylene homopolymer, titanium oxide and talc. The results are shown in FIG. 1.

EXAMPLE 2

The procedure of Example 1 was followed except that the amount of carbon black was set to 20 ppm. The results are shown in FIG. 1.

EXAMPLE 3

The procedure of Example 1 was followed except that the amount of carbon black was set to 30 ppm. the results are shown in FIG. 1.

EXAMPLE 4

The procedure of Example 1 was followed except that the amount of carbon black was set to 40 ppm. The results are shown in FIG. 1.

EXAMPLE 5

The procedure of Example 1 was followed except that the amount of carbon black was set to 50 ppm. The results are shown in FIG. 1.

EXAMPLE 6

The procedure of Example 1 was followed except that the amount of carbon black was set to 60 ppm.

Each of the test pieces obtained in Comparative Example 1 and Examples 1 to 6 had a density of 1.14 g/cm$^3$.

It is seen from the results shown in FIG. 1 that the test piece exhibits improved light intercepting characteristics by addition of a minor amount of carbon black.

EXAMPLE 7 TO 9 AND COMPARATIVE EXAMPLE 2 TO 7

Feed materials having the compositions and the proportions of the components as shown in Table 1 were dry blended and kneaded using a biaxial kneader (2 FCM manufactured by KOBE SEIKO KK) at 200° C. to produce a pellet of the resin composition.

The produced pellet was dried and injection molded to prepare test samples and light intercepting properties, brightness, color hue, bending elasticity, IZOD impact strength and density thereof were measured. The results are shown in Table 1. In Table 1, PP-A indicates a propylene homopolymer having an MI of 20 g/10 minutes and PP-B indicates an ethylene propylene copolymer having an MI of 30 g/10 minutes and an ethylene content of 5 wt. %.

Measurement was conducted by the following methods.

Light intercepting properties were measured in the same manner as in Example 1 to 6 and Comparative Example 1.

Brightness was measured using the same sample as that used for measurement of the light intercepting properties by a color difference meter MS 2020 plus manufactured by Macbth Inc. and a D 65 light source conforming to CIE-1976. Brightness was indicated in L by Lab indication.

Color hue was determined by visual observation using a D 65 standard light source and the same sample as that used in measuring the light intercepting properties.

Bending elasticity was measured in conformity to JIS K 7203.

IZOD impact strength was measured in conformity to JIS K 7111 without notches.

Density was measured in the same manner as in Examples 1 to 6 and Comparative Example 1.

The lower IZOD impact strength and the higher density of the resin composition of Comparative Example 7 are presumably ascribable to addition of an excessive amount of titanium oxide.

What is claimed is:

1. A polyolefin resin composition comprising
   (1) 67 to 96 wt. %, based on the total quantity of (1), (2) and (3), of polyolefin,

TABLE 1

| | Composition and Proportions of Components | | | | Light intercepting properties (cd/m$^2$) | Color hue | Brightness | Bending elasticity (Kg/cm$^2$) | IZOD impact strength (Kg · cm/cm) | Density (g/cm$^3$) |
|---|---|---|---|---|---|---|---|---|---|---|
| | Polyolefin | Titanium oxide (Wt. %) | Plate-shaped inorganic filler (Wt. %) | Carbon black (ppm) | | | | | | |
| | name | proportion (wt. %) | | | | | | | | |
| Example 7 | PP-A | 75 | 5 | mica 20 | 20 | 0.0616 | white | 92.4 | 34400 | 40 | 1.09 |
| Example 8 | PP-A | 80 | 10 | mica 10 | 50 | 0.0023 | white | 91.2 | 30700 | 46 | 1.05 |
| Example 9 | PP-B | 60 | 20 | talc 20 | 80 | 0.0001 | white | 90.1 | 35600 | 60 | 1.26 |
| Comp. Ex. 2 | PP-A | 75 | 5 | mica 20 | 0 | 4.71 | white | 94.6 | 34400 | 40 | 1.09 |
| Comp. Ex. 3 | PP-A | 75 | 5 | mica 20 | 300 | 0.0011 | gray | 84.7 | 33200 | 36 | 1.09 |
| Comp. Ex. 4 | PP-A | 79 | 1 | mica 20 | 20 | 982 | gray | 89.2 | 31100 | 42 | 1.05 |
| Comp. Ex. 5 | PP-B | 94 | 5 | talc 1 | 20 | 0.103 | white | 92.7 | 18100 | 76 | 0.94 |
| Comp. Ex. 6 | PP-A | 40 | 10 | talc 50 | 50 | 0.0013 | white | 87.3 | 58400 | 8 | 1.53 |
| Comp. Ex. 7 | PP-A | 40 | 30 | talc 30 | 0 | 0.0012 | white | 88.6 | 40200 | 12 | 1.60 |

The results of Table 1 indicate that addition of a minor quantity of carbon black gives rise to improvement in light intercepting properties, as may be seen from comparison of Example 7 and Comparative Example 2, that addition of an excess quantity of carbon black gives rise to lowered brightness and grayish color hue, as may be seen from comparison of Example 7 and Comparative Example 3, that an insufficient amount of addition of titanium oxide gives rise to lower light intercepting properties and grayish color hue, as may be seen from comparison of Example 7 and Comparative Example 4, that a lesser amount of the plate-shaped filler gives rise to markedly lowered toughness, as may be seen from comparison of Example 7 and Comparative Example 5, and that an addition of an excessive amount of a plate-shaped filler gives rise to markedly lowered impact strength, as may be seen from comparison of Example 8 and Comparative Example 6.

(2) 3 to 25 wt. %, based on the total quantity of (1), (2) and (3), of titanium oxide,
   (3) 3 to 30 wt. %, based on the total quantity of (1), (2) and (3), of a plate shaped inorganic filler, and
   (4) 5 to 150 ppm, based on the total quantity of (1), (2) and (3), of carbon black.

2. The polyolefin resin composition as claimed in claim 1 wherein polyolefin is a propylene homopolymer or a crystalline ethylen-propylene copolymer.

3. The polyolefin resin composition as claimed in claim 1 wherein said plate-shaped inorganic filler is selected from a group consisting of talc, mica, sericite and clay.

4. The polyolefin resin composition as claimed in claim 2 wherein said plate shaped inorganic filler is selected from a group consisting of talc, mica, sericite and clay.

* * * * *